United States Patent [19]

Buckell

[11] 4,304,533
[45] Dec. 8, 1981

[54] BODY HAVING FLUID PASSAGES

[75] Inventor: Raymond A. Buckell, Maidenhead, England

[73] Assignee: Bucknell Engineering Ltd., Maidenhead, England

[21] Appl. No.: 919,568

[22] Filed: Jun. 27, 1978

Related U.S. Application Data

[63] Continuation-in-part of Ser. No. 714,511, Aug. 16, 1976, Pat. No. 4,123,866, which is a continuation of Ser. No. 452,842, Mar. 20, 1974, abandoned.

[30] Foreign Application Priority Data

May 26, 1978 [GB] United Kingdom ............... 23107/78
May 26, 1978 [GB] United Kingdom ............... 23109/78

[51] Int. Cl.$^3$ ........................ B29D 3/02; F04B 39/12; F04B 21/08
[52] U.S. Cl. .................................... 417/539; 417/568; 264/271.1
[58] Field of Search .......................... 417/DIG. 1, 539; 138/143, 155; 137/594; 264/271, 277

[56] References Cited

U.S. PATENT DOCUMENTS 2,683,638  7/1954  Noble ................................ 138/141
3,485,419  12/1969  Taylor ................................ 92/169
3,678,811  7/1972  Penwell .............................. 92/169

*Primary Examiner*—William L. Freeh
*Attorney, Agent, or Firm*—Oblon, Fisher, Spivak, McClelland & Maier

[57] ABSTRACT

A machine manifold or body having fluid passages defined by relatively thin stainless-steel or other corrosion resistant tubular components embedded within a relatively thick molded plastics casing which serves to give the components strength to withstand the fluid pressures in the passages, and to permit a minimum of the expensive corrosion resistant material to be used. The passages may be formed by different tubular components located and preferably sealed together, or could be constituted by a single lost-wax casting of stainless-steel. Conveniently there is a rubbery layer between the thin metal passage defining components and the surrounding molded plastics casing.

19 Claims, 4 Drawing Figures

BODY HAVING FLUID PASSAGES

This application is a CONTINUATION-IN-PART of U.S. Pat. Application Ser. No. 714,511, filed the 16th Aug., 1976, now U.S. Pat. No. 4,123,866, which was itself a Continuation of U.S. Application Ser. No. 452,842, filed 20th Mar., 1974, now abandoned.

This invention relates to machines for example, fluid pumps and internal combustion engines or other machines using a working fluid. At present such machines use metal castings for defining the various fluid passages and such castings are expensive especially in respect of the considerable machining that is required. Moreover castings very often have blow holes or other irregularities which create difficulties in manufacture and it is an object of the present invention to provide a construction of such a machine which avoids some of these difficulties.

In U.S. Pat. No. 3,683,960. Kirsch, a number of tubular fluid-passage-defining members are held in juxtaposition to each other by being moulded in a solid epoxy resin block, but they are not of highly corrosion resistant materials, and they do not co-operate with each other to form a machine or a complicated fluid passage.

In U.S. Pat. No. 3,107,133, Smith, there is disclosed an electrical distribution device in which a number of mechanical components are held together by being embodied in a surrounding moulding.

Neither of those specifications teaches machines which are required to pass corrosive fluids, such as pumps and engines.

U.S. Pat. No. 1,693,520 Kondo, does teach a compound construction of an internal combustion engine cylinder but the cylinder wall is defined by a casting which has itself to be thick enough to withstand the internal fluid pressure, and which is welded to components of the cylinder head.

German Pat. No. 936,821, Geracke, shows a different kind of engine cylinder in which a steel tube defines the cylinder and radial stub steel tubes extend from it to define inlet and outlet passages for the working fluid. A light cooling body is cast around the steel tubes but it is little thicker than the steel tubes themselves and does not permit them to be substantially thinner than if they had to withstand the whole internal pressure themselves. What is more the external metal casting would have to be cast at a temperature of several hundred degrees 'C', and that would establish stresses in the steel tubes and would tend to cause them to distort.

By the present invention, a fluid passage suitable for a corrosive fluid can be provided by an expensive stainless-steel, titanium, or other, metal lining in the form of a thin standard tube, or a thin lost-wax casting, and adequate strength to enable the internal fluid pressures to be withstood can be established by surrounding the corrosion resistant metal components by a plastics or other synthetic resin moulding which can be as thick as is required to withstand the necessary pressure because it is relatively cheap as compared with the corrosion resistant metal and which can be cast at a temperature of perhaps 150°–200° C. which is not high enough to establish dangerous distorting stresses in the corrosion resistant metals.

Conveniently, an elastomeric layer is included between the metal components and the plastics casing to allow for some movement of the metal components in response to the high internal stresses without deforming the plastics layer.

Where the passages are defined by two or more tubular metal components held in juxtaposition, there may be 'O' ring or other seals at the joints to prevent corrosive liquid getting at the material of the plastics casing, but a similar effect could be achieved by forming the metal component as a lost-wax casting which can be accurately cast to its finished shape in such a material as stainless-steel but which is only economical if it is a very light weight casting. With the thin-walled metal components contemplated by this invention with the external resin reinforcement such a lost-wax casting can be quite satisfactory.

The wall thickness of the resin body may be several times as thick—perhaps five times—as the metal lining components.

The invention may be carried into practice in various ways and certain embodiments will not be described by way of example, with reference to the accompanying drawings, in which.

Figure 1:
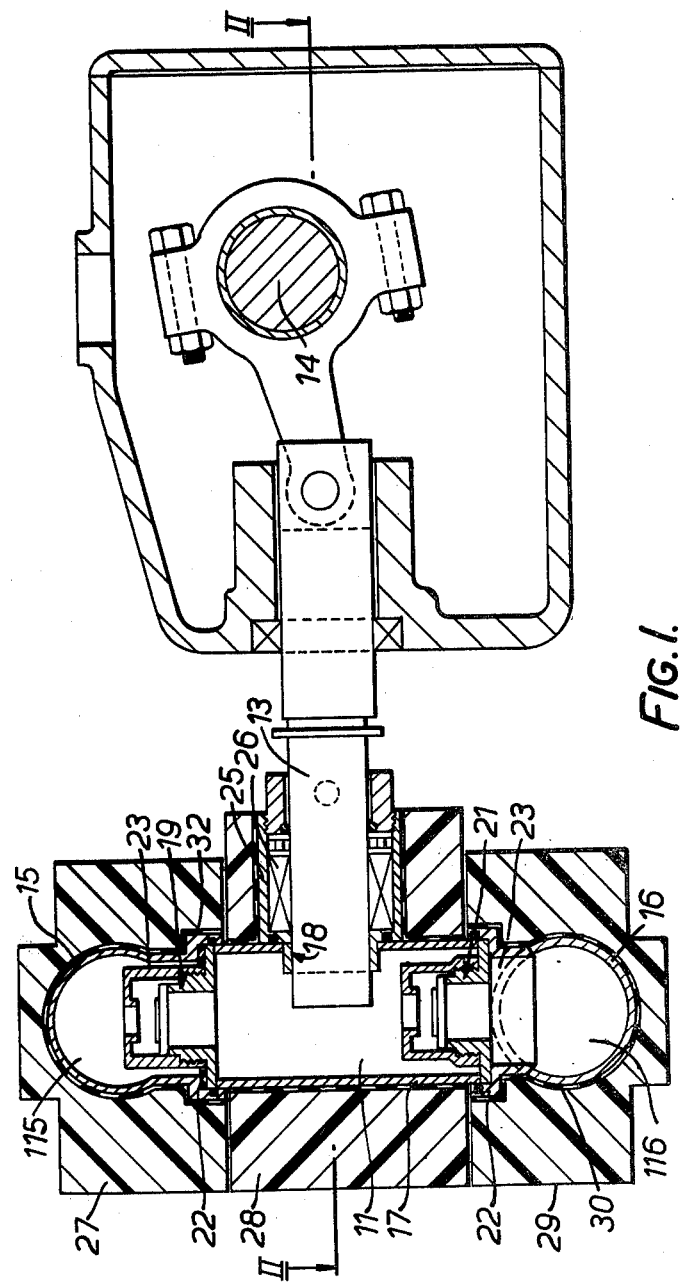
FIG. 1 shows a sectional elevation of a fluid pump embodying the invention.
Figure 2:
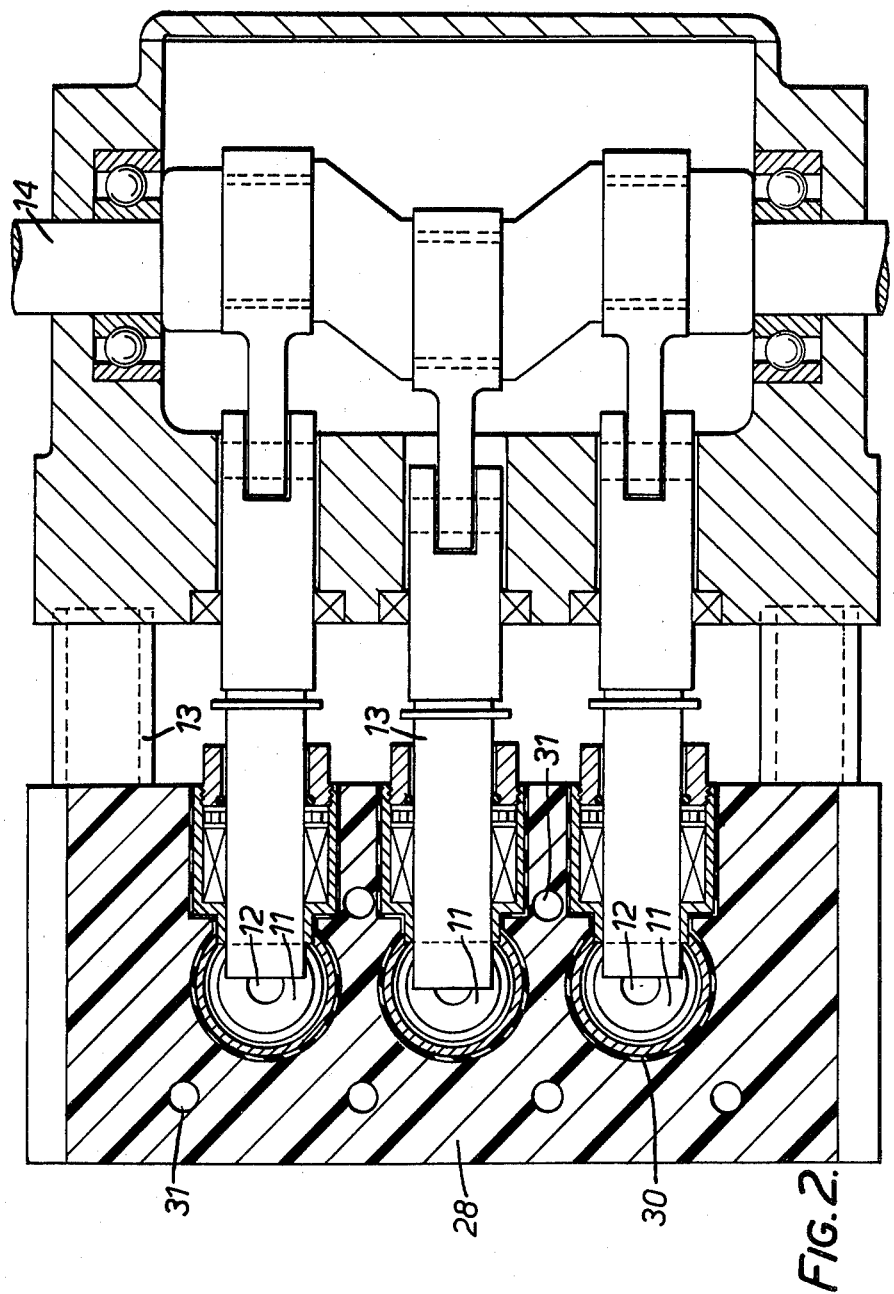
FIG. 2 is a section on the line II—II in FIG. 1.

The pump of FIGS. 1 and 2 comprises three cylinders 11 on parallel axes 12 each of which has a piston 13 arranged to be reciprocated radially in relation to the cylinder 11 by a driving shaft 14. The pistons 13 are driven with a 120° phase shift between them so that the cylinders provide pressure fluid reasonably continuously to a fluid outlet passage 115. Fluid is drawn into each cylinder 11 on the suction stroke of its piston 13 from an inlet passage 116 which is common to all three cylinders 11.

FIG. 1 shows that each cylinder 11 consists of a stainless steel cylindrical sleeve 17 having a radial bore 18 for the piston 13. At each end of the sleeve 17 is an automatic spring-loaded one-way valve arranged as an outlet valve 19 at the connection to the passage 115 and arranged as an inlet valve 21 at the connection to the passage 116. The piston 13 slides in a sleeve 25 which fits into the bore 18 in each sleeve 17 and contains a conventional seal 26.

The sleeve 25 is machined from standard stainless-steel tube and so are the components 15, 16 and 22 defining the inlet and outlet passages 115 and 116.

The pump casing is made in thee separate parts 27, 28, and 29, which are eventually bolted together to hold the pump in assembly by bolts passing through bolt holes 31.

Each part-casing is made in a similar manner in that the components each contains, for example, the component 15 and end sleeve 22 in the part-casing 27, which are positioned in a mould which is then filled with a glass-ball filled epoxy resin, which when cured forms the body 27 in which the components are embedded. The components such as 15 and 22 are thus held together in their passage defining relationship merely by both being embedded in the same moulded plastics part-casing.

In a similar manner the sleeves 17 and 25 are assembled together by being embedded in the part-casing 28, and the components 22 and 16 are held assembled together by being embedded in the part-casing 29. The valves 19 and 21 are fitted at the ends of the sleeve 17 together with seals 32, if required, after which the three part-casings are bolted together to complete the assembly.

The plastics material described is strong and provides reinforcement against bursting loads in the passages so that the metal sleeves thus can be thinner than if they had to carry full pressure themselves.

Thus expensive metals can be used most economically and since they are all of simple cylindrical tubular form there is a minimum of machining.

It has been found that a pump of this kind can be made at substantially lower cost than the equivalent pump made by machining a one piece casting, and there is an additional advantage that the fluid passages are all defined by components made from stainless steel or some other corrosion resistant material, which is thin enough not to be expensive.

The expensive metal defining the fluid passages may be so thin that it tends to deform under the fluid pressures within it, and that might cause cracking of the resin part-casings, and accordingly in some applications it has been found advisable to coat the metal components such as 25, and 17, with a lining 30 perhaps 1/32 inch thick. of a polyurethane or other rubbery or elastomeric material which can allow for some distortion of the components such as 17 without correspondingly deforming the resin body such as 28. The resin body will then be cast in the same way around the rubbery lining.

A component such as 25 may be machined from solid tube to have the form shown in FIG. 1, and to have an internal screw thread at its end for a cap to the seal 26, but it could equally be a fairly simple casting. It could be an easy fit in the bore 18 in the wall of the tube 17, but is preferably a force fit, so that the components are conveniently located together when inserted in the mould prior to filling the mould space with the resin material. The hole in a tube such as 16 can have a bevelled side as shown in FIG. 1 formed by the bevel on the end of the drill for making the hole to correspond with a similar bevel on the end of the component 22.

It is to be noted that the material of the part-casings 27, 28 and 29 which has been generally described above as being a resin can be of a wide range of materials, including for example glass fibre. The requirements are that it should be cheaper than the stainless steel or other metal for the components such as 25, 17 and 15 for defining the fluid passages so that sufficient of it can be used to give the body adequate strength to withstand the pressures involved. Also it should be possible to cast it at a temperature of perhaps between 150° and 300° C. which is not high enough to set up stresses and distortion in the metal components, such as 17. Metals such as aluminium could not be used because of the high casting temperature.

For some working fluids it does not matter if there is accidental contact of the fluid with the resin material of the part-casings, but for some corrosive fluids this cannot be permitted, so that it may be necessary to have 'O' rings or other seals at the junctions between the various metal components.

Figure 3:
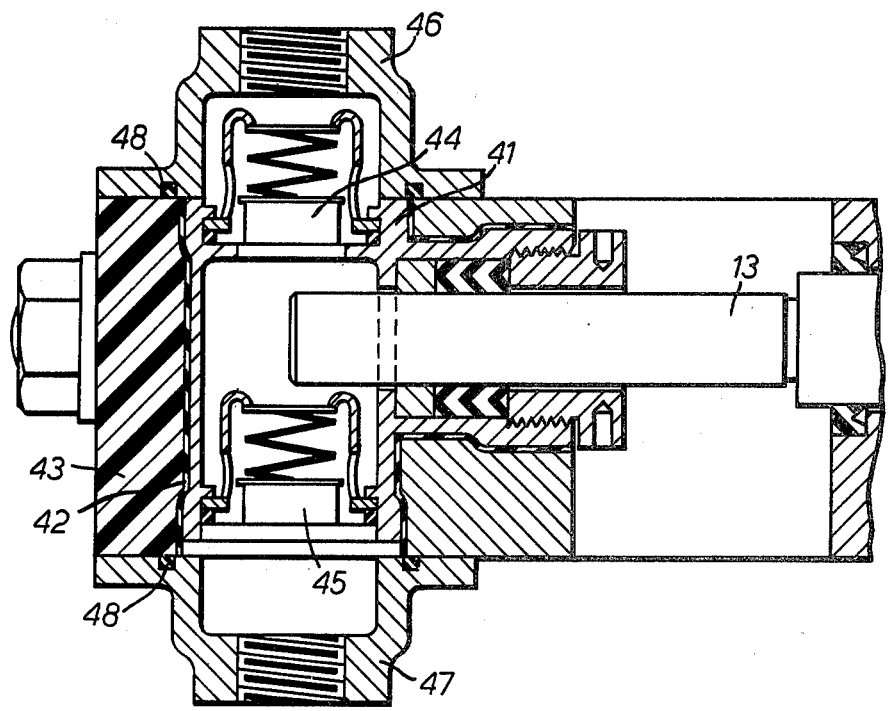
FIG. 3 is a view similar to FIG. 1 of another embodiment.

In another embodiment as shown in FIG. 3, that problem is avoided by forming the components 17 and 25 not as two separately made tubes fitted together, but as a single lost wax casting of, for example, stainless steel.

Lost wax casting enables castings of quite complicated shapes to be made with a tolerance of perhaps plus or minus 0.002 or 0.005 inches, which may only require grinding after casting, and no other machining operation, but lost wax casting methods are only economical for making fairly light castings perhaps up to about 8 oz in weight.

They would not be contemplated for a pump body of the kind known in the prior art in the form of fairly massive metal castings which require subsequent machining.

However if the components of the pump body defining the fluid passages are made quite thin, for example less than ⅛ or 1/16 of an inch in wall thickness a lost wax casting method is suitable so that the pump lining for the central part casting can be as shown in FIG. 3, and then there is no need to provide a seal between the pumping cylinder and the radial casing defining the bearings for the piston.

In the embodiment of FIG. 3, the principle of operation is the same as in the embodiment of FIGS. 1 and 2, but there is a single stainless steel lost wax casting 41 externally lined with a rubbery coating as described above, and then surrounded by a cast resin 43.

Inlet and outlet valves can be fitted at 44, and 45 in recesses in the casting, and the body 43 can be finally closed at each end by castings 46 and 47 for example of aluminium, bolted to the casting 43, and including 'O' rings at 48 to establish good fluid seals.

Figure 4:
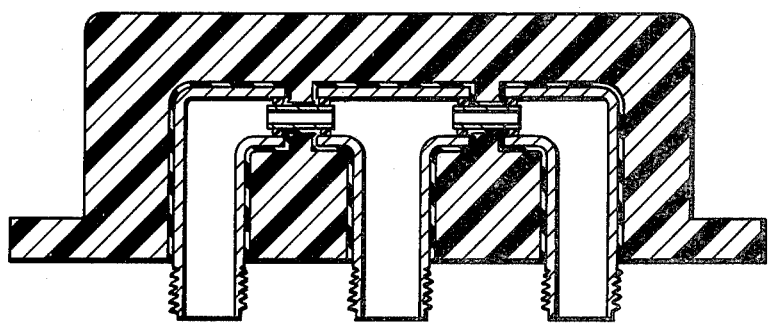
FIG. 4 is a sketch of a manifold for the embodiment of FIG. 3, and also embodying the invention.

If the pump was not a single cylinder pump, but was a three cylinder pump as described with reference to FIG. 2, the components 46 and 47 could be elongate members extending over the ends of the three cylinders side by side, and each consisting of three standard stainless steel tubes, the central one being a 'T' piece, and the outside ones angle pieces joined together with short straight tubes, all the junctions being sealed together by 'O' ring seals. The complete assembly could be made as the other components of the pump by fitting the stainless steel components together with their seals, painting a rubber coating on their outer surfaces and then casting them into a resin body in an appropriate mould to produce an end manifold as shown diagrammatically in FIG. 4.

The particular pump described is for pumping water to be desalinated in reverse osmosis equipment and can operate at a flow rate of 5 gallons per minute delivering fluid at a pressure of 1250 lbs per square inch.

The invention is equally applicable to other machines, for example, internal combustion engines, where the cylinders and valve passages and interconnections would be defined by similar simply machined hollow cylindrical components.

A sealing compound can be disposed at the joints between the components, and it will be seen that the fluid can flow through passages defined entirely by the component material, so that there can be no contamination.

In one example, the various components of one pump sub-assembly were grit blasted on the external surfaces, care being taken to protect their internal surfaces by masking tapes.

They were then assembled in correct alignment in a demountable mould. 200 grammes of a commercial eposcide resin (Araldite F) were mixed with 64 grammes of a liquid hardener which is essentially 4.4. diamino diphenyl methane. The mixture was heated to 60° C. and outgassed using appropriate vacuum techniques.

900 grammes of solid glass microspheres in the size range 400–500 microns were combined with 200 grammes of glass microspheres in the size range 30–60 microns to achieve bimodal packing and the mixture heated to 80° C.

The resin hardener mixture at 60° C. was then added to the warm glass heads, the mixture outgasses by vacuum and poured round the pump assembly mounted in the mould. The mould was then placed in an oven and cured at 120° C. for one hour.

The mould was removed from the oven, cooled, and disassembled to remove the moulded pump sub-assembly and the sub-assembly was post cured for 4 hours at 180° C.

If desired, the moulding material could include carbon, glass, or other, fibre reinforcement, particularly around the holes 31. Also the moulded casing could be externally protected by sheet metal or metal angle at vulnerable points.

In the example described, the wall thickness of the moulded casing is at least about five times the wall thickness of the stainless steel tubes or lost-wax castings.

What I claim is:

1. A motive fluid power device, such as a pump, internal combustion engine and the like, for handling corrosive working fluids and which has working fluid passages therein with inlets and outlets to and from the device, comprising:
   a plurality of relatively thin, abutting, corrosion resistant tubular components extending between the inlets and outlets, throughout the entire working fluid passages;
   a relatively thick casing of a solid plastics material cast around the relatively thin corrosion resistant tubular components, holding the tubular components in desired positional relationship and reinforcing the tubular components to withstand internal pressures; and
   a cushioning layer of material on the tubular components between the tubular components and plastics material casing for preventing damage to the casing caused by distortion of the tubular components upon load,
   whereby the corrosion resistant tubular components may be made with much thinner wall thickness than would otherwise be possible, and the use of separate fasteners for holding the components in assembled relationship is obviated, and further wherein the plastics material casing is protected from the corrosive working fluids.

2. A device as claimed in claim 1 in which the components are keyed together.

3. A device as claimed in claim 1, in which the components are lengths of standard metal tube.

4. A device as claimed in claim 1, comprising an elastomeric layer between the tubular components and the thick casing.

5. A device as claimed in claim 1, comprising an elastomeric layer between the tubular component and the relatively thick casing.

6. A device as claimed in claim 1, in which the tubular components are of metal.

7. A device as claimed in claim 6, in which the metal is stainless-steel.

8. A device for handling corrosive fluids, comprising a molded body of solid plastics material having fluid passages therein defined entirely by at least one relatively thin tubular corrosion-resistant component, which component is embedded in a surrounding, relatively thick casing of the solid plastics material molded in situ around the component, and a cushioning layer of material provided on the tubular component between the component and the plastics material casing for preventing damage to the casing caused by distortion of the tubular component upon load, whereby the casing holds the component in position and reinforces it, enabling the component to be made with much thinner wall thickness than would otherwise be possible.

9. A device as claimed in claim 8, comprising a pump body.

10. A device as claimed in claim 8, in which the component has a wall less than $\frac{1}{8}$th inch thick.

11. A device as claimed in claim 8, in which the tubular component is of a metal.

12. A device as claimed in claim 11, in which the metal is stainless-steel.

13. A device for handling corrosive fluids, having fluid passages defined entirely by at least two relatively thin corrosion resistant tubular metal components sealed together in juxtaposed relationship to define the fluid passages, said components being held together and reinforced by being embedded in a relatively thick casing of a solid plastics material molded in situ around the components, and a cushioning layer of material provided on the tubular components between the components and the plastics material casing for preventing damage to the casing caused by distortion of the tubular components upon load, the corrosion resistant components thus being capable of being made with much thinner wall thickness than would otherwise be possible, and the use of separate mechanical fasteners for holding the components in assembled relationship being obviated.

14. A device as claimed in claim 13 or 1 in which the tubular components have walls less than $\frac{1}{8}$th of an inch thick.

15. A device as claimed in claim 13 or 1 including fluid seals between the tubular components where they are held in positional relationship together.

16. A device as claimed in claim 8 or 13, comprising a body whose fluid passages define a pump chamber with inlet and outlet valves fitted to the body.

17. A device as claimed in claim 16, including inlet and outlet manifolds assembled with the body.

18. A device as claimed in claim 1, 8 or 13, the casing has a wall at least five times as thick as a wall of the tubular components.

19. A device as claimed in claim 1, 8 or 13, constituting the working chamber of a pump.

* * * * *

UNITED STATES PATENT AND TRADEMARK OFFICE
CERTIFICATE OF CORRECTION

PATENT NO. : 4,304,533
DATED : Dec. 8, 1981
INVENTOR(S) : Raymond A. Buckell

It is certified that error appears in the above—identified patent and that said Letters Patent is hereby corrected as shown below:

Please correct the Assignee Information to read as follows:

[73]---Assignee: Buckell Engineering Ltd.,

Maidenhead, England---.

Signed and Sealed this

Twenty-third Day of March 1982

|SEAL|

*Attest:*

*Attesting Officer*

GERALD J. MOSSINGHOFF

*Commissioner of Patents and Trademarks*